United States Patent
Mueller et al.

[11] Patent Number: 6,023,877
[45] Date of Patent: Feb. 15, 2000

[54] FISHING LURE HOOK HOLDER

[76] Inventors: Ron Mueller, 5548 S. Neva, Chicago, Ill. 60638; Jim Mueller, 11211 W. 71st St., Burr Ridge, Ill. 60525

[21] Appl. No.: 09/017,155

[22] Filed: Feb. 2, 1998

[51] Int. Cl.[7] .................................................. H01K 87/00
[52] U.S. Cl. .................................. 43/43.1; 43/25; 43/25.2
[58] Field of Search .......................... 43/42.41, 42.4, 43/25.2, 43.1, 42.49; 24/115 H, 3.4; 224/258; 35/157; 2/13

[56] References Cited

U.S. PATENT DOCUMENTS

| | | | |
|---|---|---|---|
| 2,563,236 | 8/1951 | Gragg | 43/25.2 |
| 2,572,889 | 10/1951 | Strykower | 224/258 |
| 2,584,430 | 2/1952 | Dayton et al. | 43/25.2 |
| 2,602,258 | 7/1952 | Elko | 43/25.2 |
| 2,667,010 | 1/1954 | Anderson | 43/25.2 |
| 2,829,461 | 4/1958 | Tuttle | 43/25.2 |
| 2,865,128 | 12/1958 | Fallert | 43/25.2 |
| 3,086,312 | 4/1963 | Davis | 43/25.2 |
| 3,190,027 | 6/1965 | Spangler | 43/25.2 |
| 3,363,357 | 1/1968 | Sokol | 43/42.4 |
| 3,397,026 | 8/1968 | Spina | 351/157 |
| 3,988,850 | 11/1976 | Steinman | 43/25.2 |
| 4,457,095 | 7/1984 | Stevenson | 43/25.2 |
| 5,020,264 | 6/1991 | Demski | 43/25.2 |
| 5,131,180 | 7/1992 | Ives | 43/25.2 |
| 5,214,874 | 6/1993 | Faulkner | 43/25.2 |
| 5,535,541 | 7/1996 | Fisher | 43/57.1 |
| 5,598,658 | 2/1997 | Walker | 43/25.2 |

*Primary Examiner*—Michael J. Carone
*Assistant Examiner*—Fredrick T. French, III
*Attorney, Agent, or Firm*—Patula & Associates

[57] ABSTRACT

A fishing lure hook holder is disclosed and comprises generally a body 20, a first securing element 40, and a second securing element 60. Body 20 generally includes a first loop end and a second end. First securing element 40 is slidably positionable along body 20. Second securing element 60 can be fastened at a second end or can be slidable along body 20. In use on a two hook fishing lure, the first loop end engages one of the fishing hooks while the first securing element is positioned around the second fishing hook to securely hold the fishing hooks against the fishing lure in proximity thereto and to prevent movement of the fishing hooks during storage. In use on a three hook fishing lure, the first looped end engages the first treble hook. The first securing element engages the second treble hook. The second securing element engages the third treble hook.

4 Claims, 10 Drawing Sheets

FISHING LURE HOOK HOLDER

The present invention relates to fishing devices and in particular a device for holding the hooks of a fishing lure, specifically, a fishing lure hook holder for securely holding two or more hooks of a fishing lure when not in use.

BACKGROUND OF THE INVENTION

Fishing lures have long presented a problem during non-use in that the hooks of a fishing lure often become entangled with other lures or other items in a storage box such as a tackle box. Additionally, the hooks of a lure may become entangled with the fishing pole as well, including with the rod lockers and the fishing line itself. Further, loose fishing lure hooks can present a hazard and can injure a person coming into contact with the fishing lure. Accordingly, there has long been a need to secure the hooks of a fishing lure when not in use.

There have been several prior art attempts at securing fishing lures and their hooks when not in use. However, such prior art devices have many disadvantages including being cumbersome and time consuming to use. For example, U.S. Pat. No. 3,363,357 issued to Sokol on Jan. 16, 1968 discloses a fish hook guard comprising a disk-like element which slides onto the shaft of a treble hook to shield the barbed points of the trebled hooks. The fish hook guards of Sokol have the disadvantage of being time consuming to use in that each treble hook on a lure must independently incorporate a shield guard. Additionally, the shield guards are bulky and actually increase the necessary amount of storage space for the lure. Further, the treble hooks remain free to move relative to the lure, thus maintaining the capability of becoming entangled in fishing line or other items.

U.S. Pat. No. 2,829,461 issued to Tuttle on Apr. 8, 1958 discloses a device for supporting fishing lures and protecting fishing hooks. The device of Tuttle has several disadvantages including being cumbersome and time consuming to use. Further, the device is to be used in association with a fishing rod to strap the fishing lure to the fishing rod. Additionally, a disk-like element similar to Sokol is used to shield the barbed points of a hook. The device of Tuttle does not make provisions for the securing and storage of a lure having multiple treble hooks.

U.S. Pat. No. 3,988,850 issued to Steinman on Nov. 2, 1976 discloses a fishing line tensioner and tackle holder which comprises a device having a large loop and a small loop. The large loop is placed around the handle of a fishing pole, while the small loop remains free to engage a hook attached to the fishing line. The device of Steinman does not provide for the securing of the hooks of a fishing lure for storage within a tackle box. Further, the device of Steinman does not make provisions for securing multiple hooks of a fishing lure.

Accordingly, there is a need for a fishing lure hook holder that is relatively easy to use, noncumbersome, and that can be quickly engaged and disengaged from the fishing lure. Additionally, there is a need for a device that can securely hold the one or more hooks of a fishing lure securely against the fishing lure. The present invention solves the problems and disadvantages of the prior art fishing lure hook holders.

BRIEF SUMMARY OF THE INVENTION

The present invention comprises a fishing lure hook holder generally having three main components defining a body, a first securing element, and a second securing element. While the invention may be embodied in several different forms, the body generally takes the form of a flexible or elastic band, cord, or strip having a first end and a second end. The first end of the body preferably includes a loop or other element capable of receiving a fish hook.

The first securing element generally comprises a sliding element capable of receiving a fish hook. The second securing element comprises an element capable of receiving a fish hook.

In use on a fishing lure having two treble hooks, the looped first end of the body engages the front treble hook, while the sliding element is positioned along the body to engage the back treble hook, while the second securing element remains free. In use on a fishing lure having three treble hooks, the first looped end receives the first treble hook, the sliding element receives the middle treble hook, while the second securing element receives the last treble hook. In this manner, the treble hooks are held in close relationship to the lure for convenience of storing, while at the same time the present invention remains quickly and readily detachable for use of the lure.

Accordingly, it is the principle object of the present invention to provide a means for securing fishing lure hooks to prevent the hooks from becoming readily entangled in other objects.

It is a further object of the present invention to provide a fishing lure hook holder that is relatively small and quick and easy to install and remove from a fishing lure.

It is also an object of the present invention to provide a fishing lure hook holder capable of securing the fishing hooks of a lure having various amounts of hooks.

It is an additional object of the present invention to provide a fishing lure hook holder which secures the fishing hooks of a fishing lure securely against the lure.

It is yet another object of the present invention to teach a method of securing fishing lure hooks to a fishing lure for storage.

It is another object of the present invention to teach a novel fishing lure hook holder that is efficient, inexpensive, and easy to use.

Numerous other advantages and features of the invention will become readily apparent from the detailed description of the preferred embodiment and alternate embodiments of the present invention, from the claims, and from the accompanying drawings.

BRIEF DESCRIPTION OF THE DRAWINGS

A fuller understanding of the foregoing may be had by reference to the accompanying drawings wherein:

FIG. 23b illustrates an enlarged cross-sectional view of the slider of FIG. 23a.

DETAILED DESCRIPTION OF THE EMBODIMENTS OF THE PRESENT INVENTION

While the invention is susceptible of embodiment in many different forms, there is shown in the drawings and will be described herein in detail a preferred embodiment and alternate embodiments of the present invention. It should be understood, however, that the present disclosure is to be considered an exemplification of the principles of the invention and is not intended to limit the spirit and scope of the invention and/or claims of the embodiment illustrated.

Figure 1:
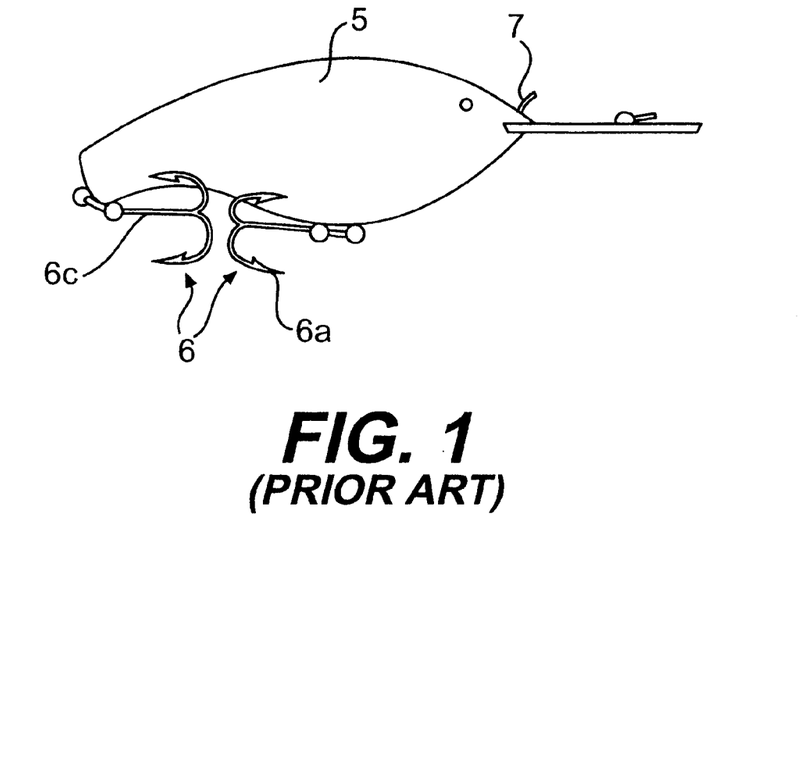
FIG. 1 is a side view of a prior art fishing lure.

FIG. 1 illustrates a prior art fishing lure 5 having fishing hooks 6 including a front treble hook 6a and a back treble hook 6c. Fishing lure 5 further includes an eyelet 7 for attaching a fishing line. Fishing hooks 6 are free to move relative to the fishing lure 5. However, the fishing hooks 6 are illustrated in the preferred location for storage.

Figure 2:
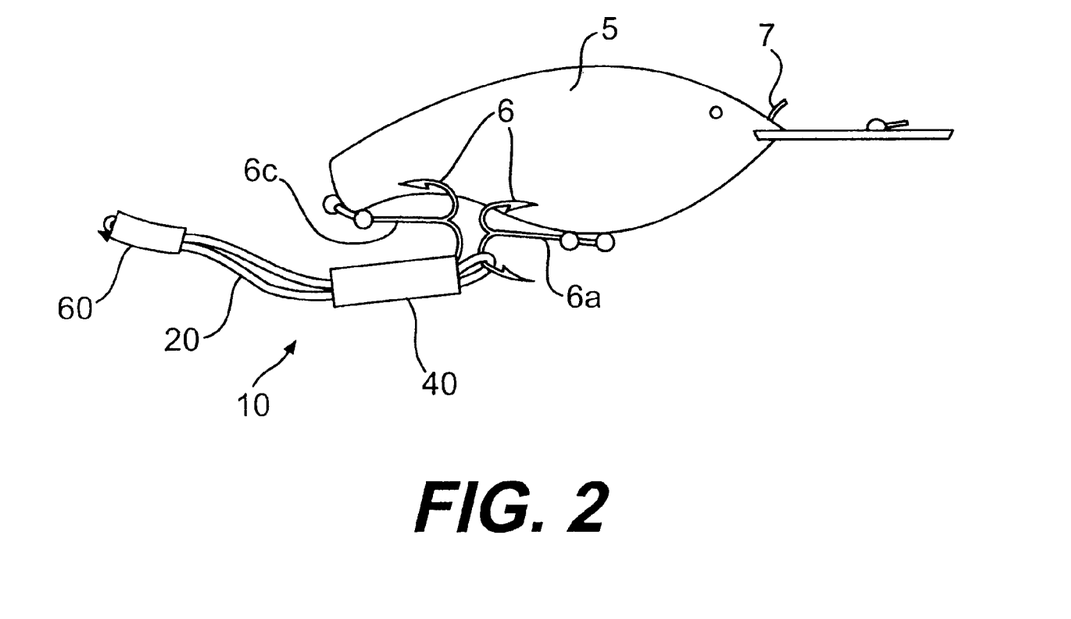
FIG. 2 is a side view of the prior art fishing lure having its hooks secured by the fishing lure hook holder of the present invention.

FIG. 2 illustrates the first embodiment of the present invention shown in use on the two hook fishing lure 5 having first treble hook 6a, back treble hook 6c, and eyelet 7. The present invention 10 comprises generally a body 20, a first securing element 40, and a second securing element 60. The present invention 10 is engaging the hooks 6 of fishing lure 5 to hold the hooks in the desired storage position, as will be described in more detail later.

Figure 3:
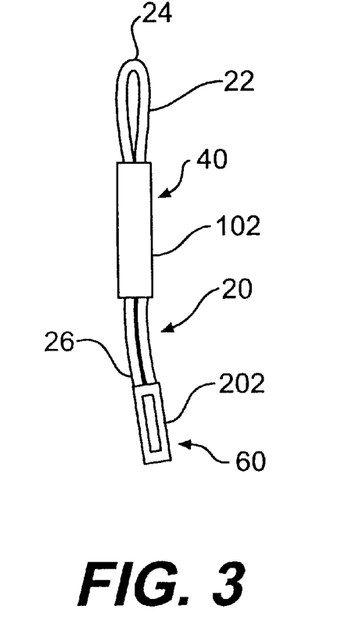
FIG. 3 is a front view of the fishing lure hook holder of the present invention.

FIG. 3 shows the first embodiment of the present invention including body 20, first securing element 40 and second securing element 60. In the first embodiment of the present invention, body 20 comprises an elastic band 22 having a first looped end 24 and a second end 26. First securing element 40 comprises a slider element 102 capable of being positioned along body 20. Second securing element 60 comprises a pull tab 202.

Figure 4:
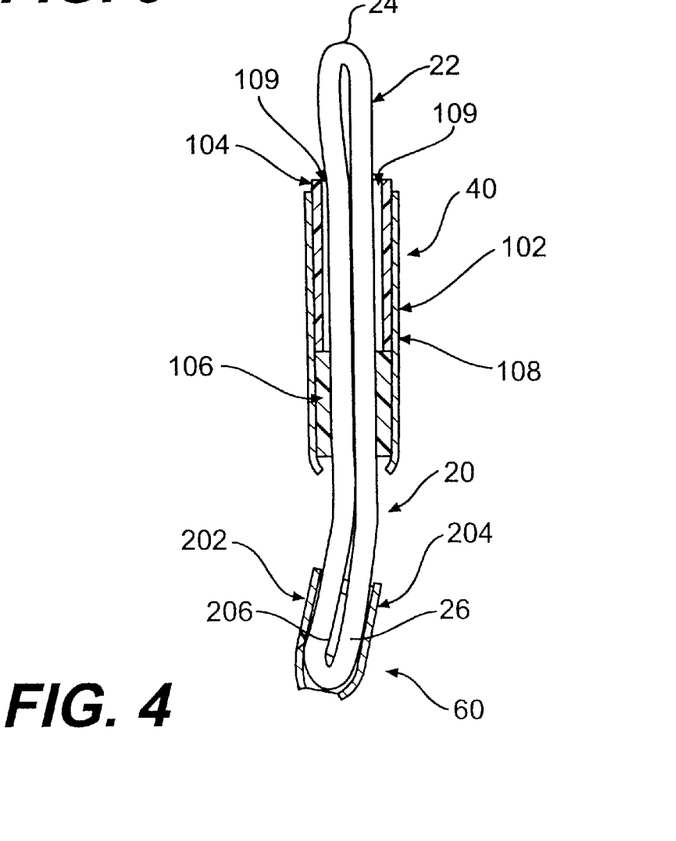
FIG. 4 is a partial cross-sectional view of the fishing lure hook holder of the present invention.
Figure 5:
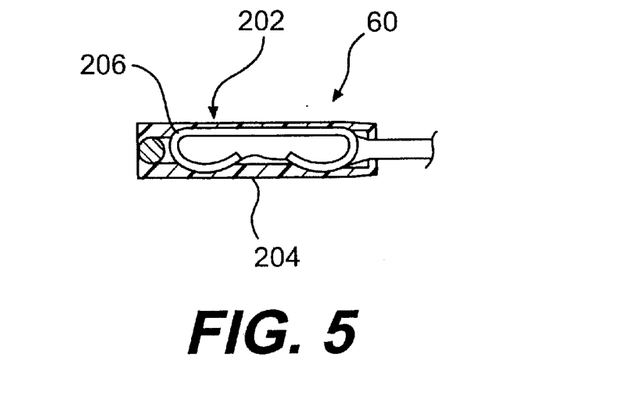
FIG. 5 is a cross section of the second securing element of the present invention.

Referring now to FIG. 4, the slider element 102 includes a nylon tubing 104 and a polyethylene tubing 106, which are held in uniform position by a shrink wrap 108. As can be seen in FIG. 4, tubing 104 has a greater inner diameter than tubing 106, thus leaving an annular space 109 between body 20 and tubing 104. Pull tab 202 is illustrated as comprising a shrink wrap 204 having a staple 206 therethrough, as can be better seen in FIG. 5.

Figure 6:
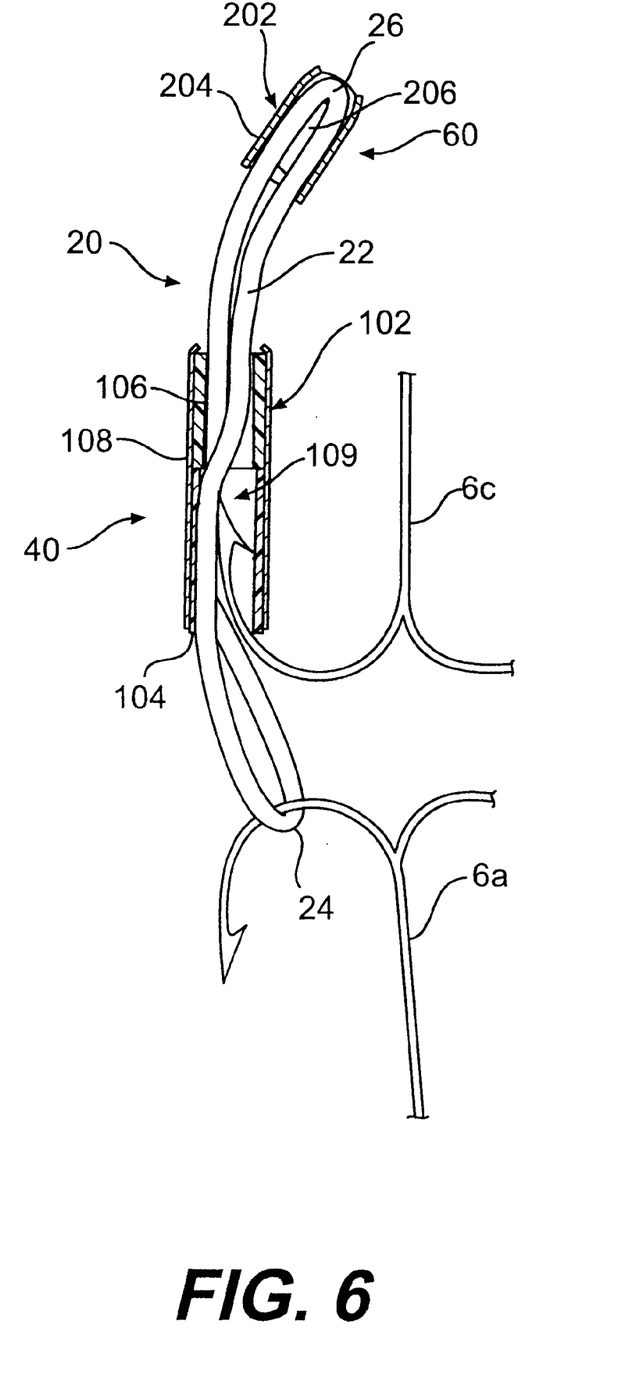
FIG. 6 illustrates a partial cross-sectional view of the preferred embodiment of the present invention in use on the hooks of a fishing lure.

FIG. 6 illustrates the first embodiment of the present invention in use on the two treble hooks of a two hook fishing lure wherein the first looped end 24 engages one of the hook elements of the front treble hook 6a. Slider 102 is then positioned to receive in space 109 one of the hooks elements of the back treble hook 6c. Slider 102 is preferably held in position via frictional contact with body 20. Pull tab 202 remains free and can be used to engage and disengage the present invention from the hooks. The same is accomplished by a user grasping the pull tab 202 while the first looped end 24 is engaged with the first treble hook 6a and pulling taunt. This allows the slider element 102 to be readily positioned over one of the pointed, barbed hooks for use or away from the hook to be disengaged. First looped end 24 is easily placed over the hook 6a or removed from hook 6a as desired.

Figure 7:
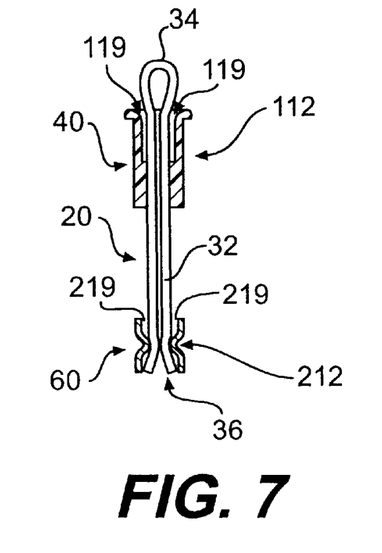
FIG. 7 illustrates a partial cross-sectional view of a second alternate embodiment of the present invention.

FIG. 7 illustrates the second alternate embodiment of the present invention wherein body 20 comprises a flexible cord 32 having a first looped end 34 and a second end 36. First securing element 40 comprises an integral slider 112 preferably made from plastic or other suitable materials such as steel, etc. As can be seen in FIG. 7, slider 112 includes an annular space 119 therein. Second securing element comprises a crimp 212 fastened to the flexible cord 32 at the second end 36. Crimp 212 is likewise made from suitable material such as plastic or metal. In this embodiment, the crimp 212 is preferably securely fastened at the end 36. As with slider 112, metal crimp 212 also includes an annular space 219.

Figure 8:
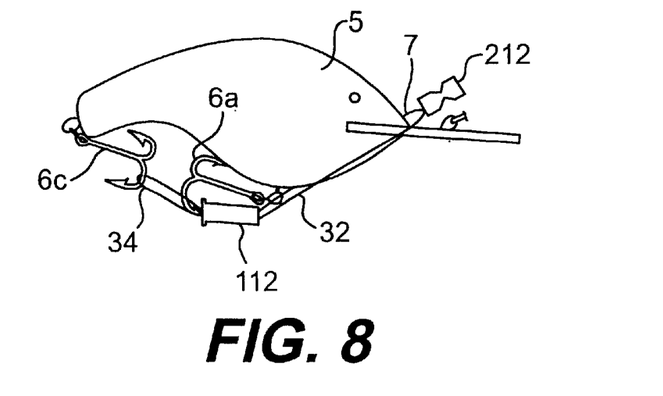
FIG. 8 illustrates a side view of the second alternate embodiment in use on a two hook fishing lure.

FIG. 8 illustrates one method of securing the hooks of a two hook fishing lure using the second alternate embodiment of the present invention. The first looped end 34 engages the back treble hook 6c. The slider 112 is positioned over the front treble hook 6a. The crimp 212 is then positioned over the eyelet 7 of the fishing lure. It should be understood, however, that the second alternate embodiment of the present invention could be used in a similar manner as illustrated in FIG. 2 for the first embodiment of the present invention.

Figure 9:
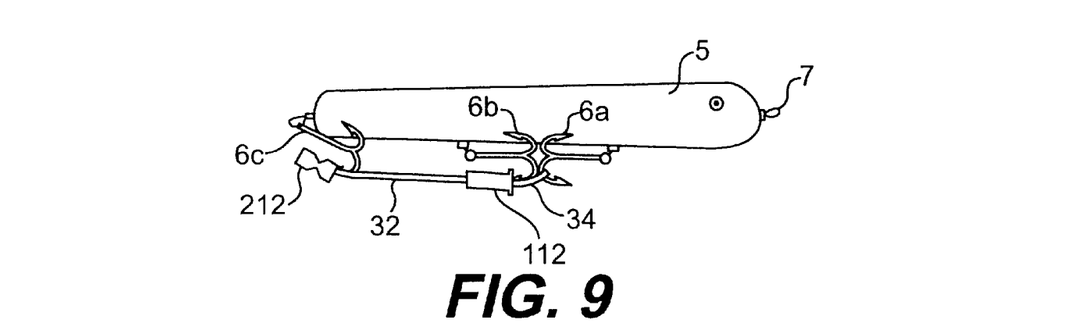
FIG. 9 illustrates the second alternate embodiment of the present invention in use on a three hook fishing lure.

FIG. 9 illustrates the second alternate embodiment of the present invention in use on a three hook fishing lure wherein the first looped end 34 is positioned around first treble hook 6a. Slider 112 is positioned over the middle treble hook 6b, while the crimp 212 is positioned over the back treble hook 6c.

Figure 10:
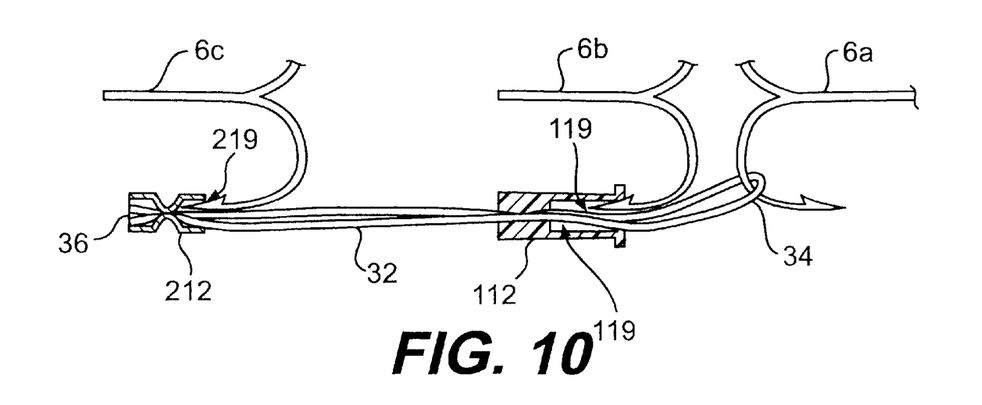
FIG. 10 illustrates a partial cross-sectional view of the second alternate embodiment of the present invention in use on the hooks of a hook fishing lure.

FIG. 10 illustrates an enlarged partial cross-sectional view of the second alternate embodiment of the present invention in use on a three hook fishing lure. As can be seen, first looped end 34 engages treble hook 6a. Slider 112 engages treble hook 6b which is inserted into spaced 119. Crimp 212 engages treble hook 6c to securely hold the treble hooks of the Crimp 45, slider 122, and crimp 222 each include an annular space 49, 129, and 229 respectively. three hook fishing lure as illustrated in FIG. 9.

Figure 11:
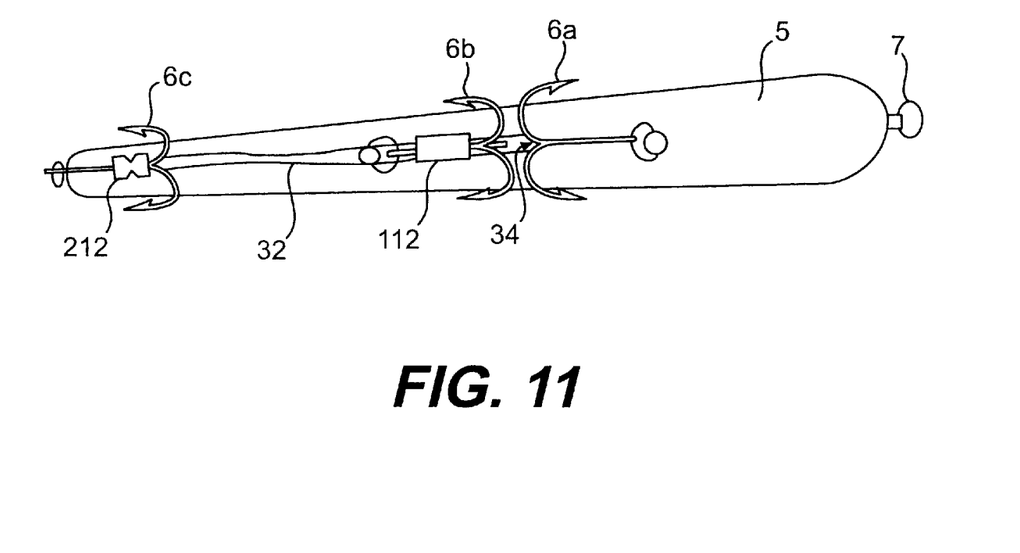
FIG. 11 illustrates a bottom view of the second alternate embodiment of the present invention in use on a three hook fishing lure.

FIG. 11 shows a bottom view of the second alternate embodiment of the present invention in use on a three hook fishing lure 5. First looped end 34 engages treble hook 6a. Slider 112 engages treble hook 6b. Crimp 212 engages treble hook 6c to securely hold the treble hooks in close proximity to the fishing lure 5 and to prevent movement of treble hooks 6a, 6b, and 6c during storage.

Figure 12:
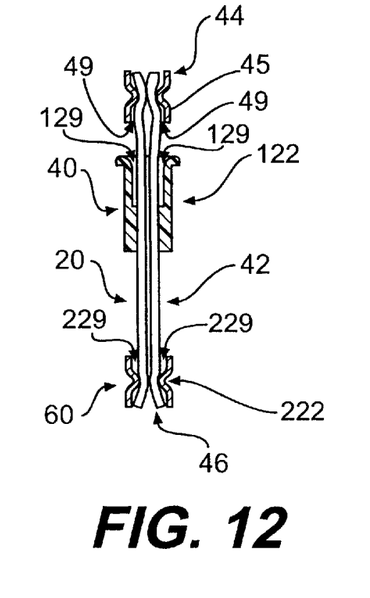
FIG. 12 illustrates a third alternate embodiment of the present invention.

FIG. 12 illustrates a third alternate embodiment of the present invention wherein body 20 comprises a flexible cord 42 having a first crimp end 44. A crimp 45 is secured to first crimp end 44. Flexible cord 42 further comprises a second end 46. Securing element 40 comprises a slider 122. Second securing element 60 comprises a metal crimp 222.

Figure 13:
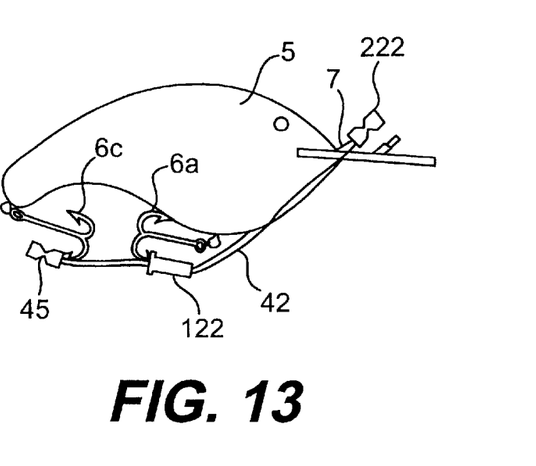
FIG. 13 illustrates a side view of the third alternate embodiment in use on a two hook fishing lure.

FIG. 13 illustrates the third alternate embodiment of the present invention in use to secure the hooks of a two hook fishing lure. The third alternate embodiment of the present invention is secured in the same manner as the second alternate embodiment, as illustrated in FIG. 8, with the exception of crimp 45 being positioned around treble hook 6c rather than loop 34 being positioned over treble hook 6c, as illustrated in FIG. 8. Again, it should be understood that the third alternate embodiment of the present invention could be utilized in the same manner as illustrated in FIG. 2.

Figure 14:
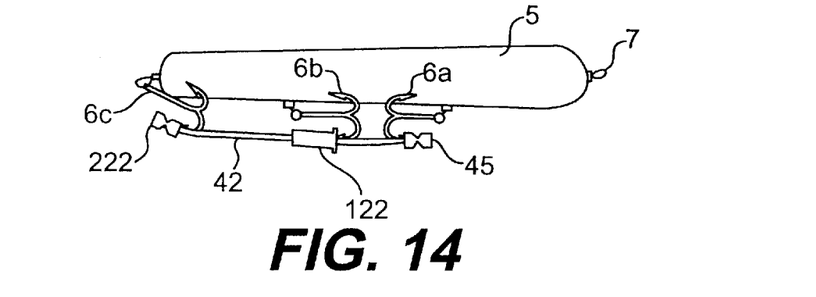
FIG. 14 illustrates the third alternate embodiment of the present invention in use on a three hook fishing lure.

FIG. 14 illustrates the third alternate embodiment of the present invention in use on a three hook lure. Use of the third alternate embodiment of the present invention is essentially the same as that illustrated in FIG. 9 for the second alternate embodiment with the exception of the crimp 45 being placed around treble hook 6a instead of loop 34 being placed around treble hook 6a as shown in FIG. 9.

Figure 15:
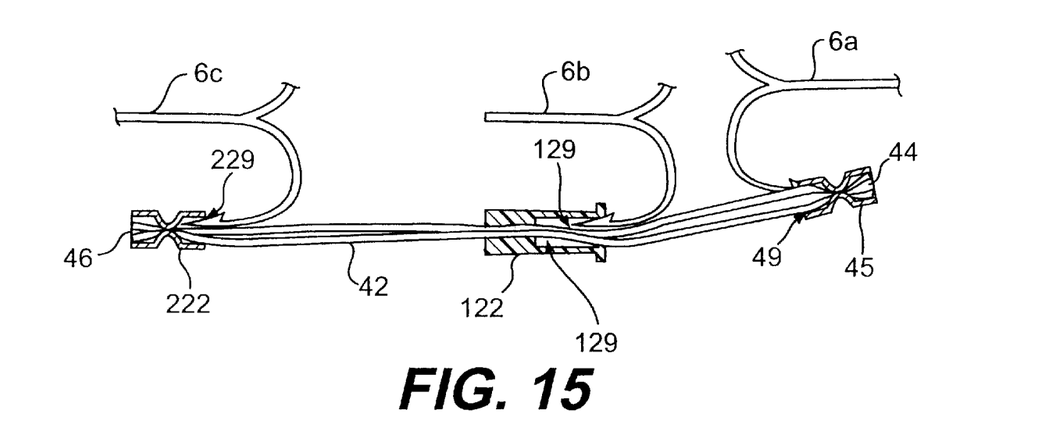
FIG. 15 illustrates a partial cross-sectional view of the third alternate embodiment of the present invention in use on the hooks of a hook fishing lure.

Similarly, FIG. 15 illustrates the third alternate embodiment of the present invention in the same manner as FIG. 10 illustrated the use of the second alternate embodiment of the present invention with the exception again being the crimp 45 securing treble hook 6a instead of loop 34 securing treble hook 6a as shown in FIG. 10. As seen in FIG. 15, crimp 45, slider 122, and crimp 222 each receive in space 49, 129, and 229 respectively, treble hook 6a, 6b, and 6c, respectively.

Figure 16:
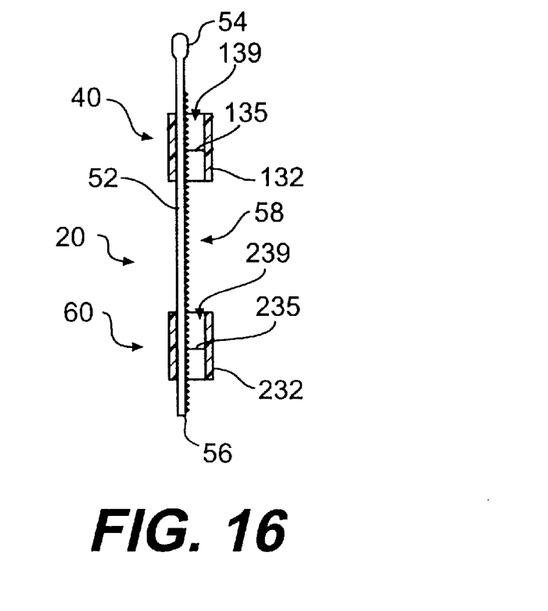
FIG. 16 illustrates a partial cross-sectional side view of a fourth alternate embodiment of the present invention.

FIG. 16 illustrates a fourth alternate embodiment of the present invention wherein body 20 comprises a molded strip 52 having a first looped end 54 and a second end 56. Molded strip 52 comprises a plurality of teeth 58 therealong. First securing element 40 comprises a slider element 132 having a finger 135 capable of engaging teeth 58, and a hook receiving space 139. Second securing element 60 comprises a slider element 232 and a finger 235 capable of engaging teeth 58, and a hook receiving space 239. It should be understood that fingers 135 and 235 could take any suitable shape for engaging teeth 58. Further, a plurality of fingers may be provided in sliders 132 and 232. Additionally, end 56 may be provided with a stop or suitable abutment for preventing the sliders from becoming disengaged from the molded strip 52.

Figure 17:
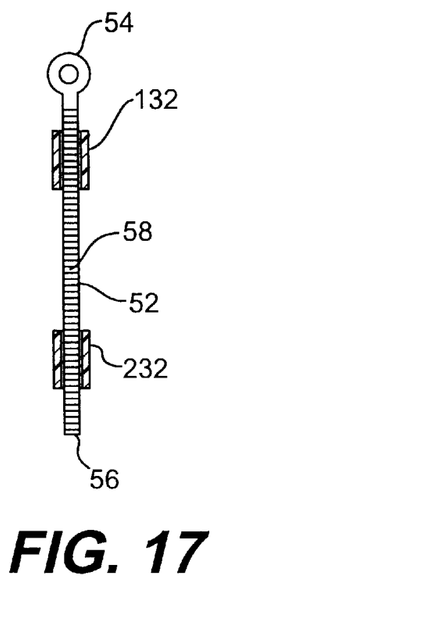
FIG. 17 illustrates a front partial cross-sectional view of the fourth alternate embodiment of the present invention.

FIG. 17 illustrates a front view of the fourth alternate embodiment of the present invention wherein sliders 132 and 232 are partially broken away to reveal the teeth 58 of the molded strip 52. As can be seen, molded strip 52 includes a first loop end 54 and a second end 56. It should be understood that each of the elements of the present invention can be made from a suitable material such as plastic, metal, etc.

Figure 18:
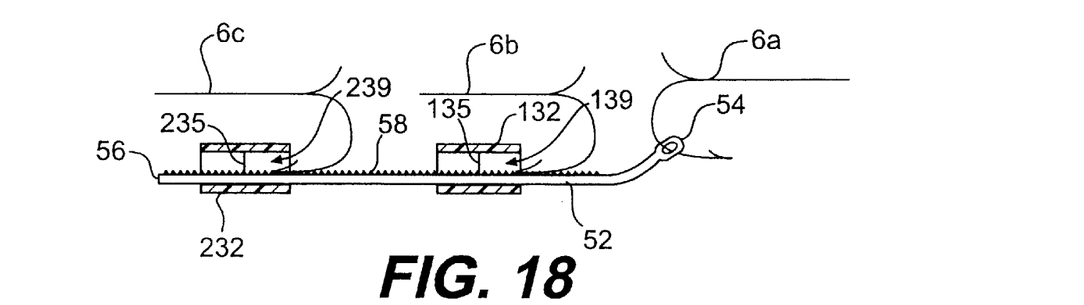
FIG. 18 illustrates a side partial cross-sectional view of the fourth alternate embodiment of the present invention in use on the fish hooks of a fishing lure.

FIG. 18 illustrates the fourth alternate embodiment of the present invention in use engaging three treble hooks of a three hook fishing lure. In use, the first looped end 54 is positioned around the front treble hook 6a. Slider 132 is then slid around the middle treble hook 6b which is received and slider 232 is positioned around the back treble hook 6c which is recieved in space 239. Fingers 135 and 235 of sliders 132 and 232 respectively engage teeth 58 to prevent the sliders from unwanted movement during storage. It should be understood, however, that the fishing lure hook holder of the present invention can be rotated 180 degrees to engage the fishing lure hooks such that the first loop 54 would engage treble hook 6c while the second slider 232 would engage the front treble hook 6a.

Figure 19:
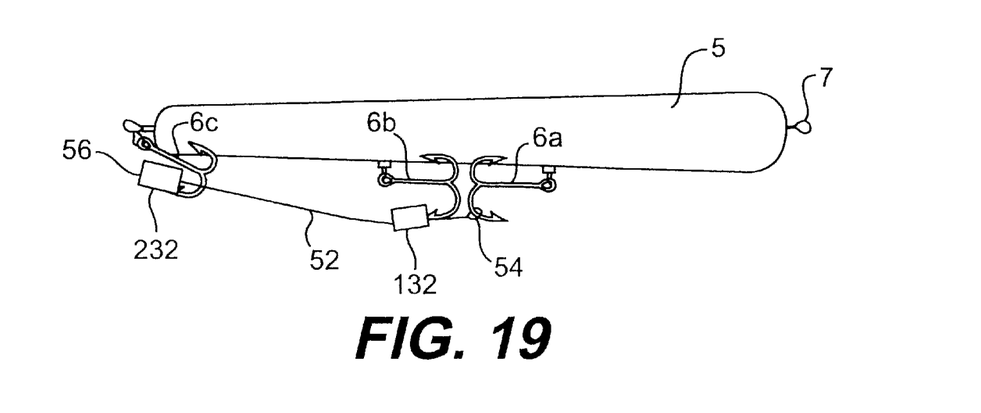
FIG. 19 illustrates a side view of the fourth alternate embodiment of the present invention in use on a three hook fishing lure.

FIG. 19 illustrates a side view of the fourth alternate embodiment of the present invention in use on a three hook fishing lure 5 in the same manner as illustrated in FIG. 18. As can be seen, strip 52 is flexible to allow suitable deformation during use.

Figure 20A:
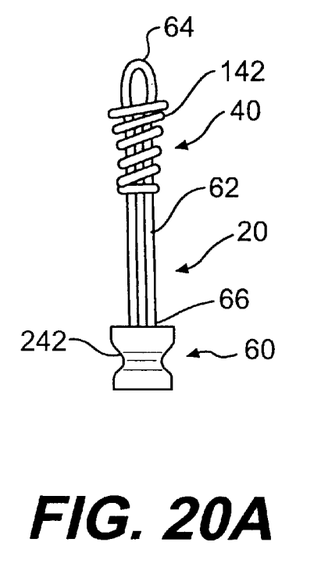
FIG. 20a illustrates a front view of a fifth alternate embodiment of the present invention.

FIG. 20a illustrates a fifth alternate embodiment of the present invention wherein body 20 comprises a flexible cord 62 having a first looped end 64 and second end 66. First securing element 40 comprises a spring slider 142 and second securing element 60 comprises a crimp 242.

Figure 20B:
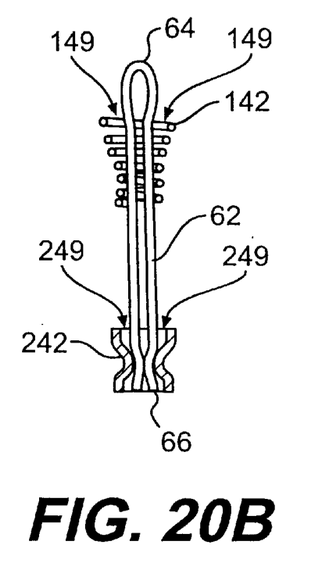
FIG. 20b illustrates a partial cross-sectional view of the fifth alternate embodiment of the present invention.

FIG. 20b illustrates the fifth alternate embodiment of the present invention wherein a partial cross-sectional view of the spring slider 142 and the crimp 242 are suitably positioned on the flexible cord 62 as described above. As can be seen, slider 142 and crimp 242 include hook receiving spaces 149 and 249 respectively.

Figure 20C:
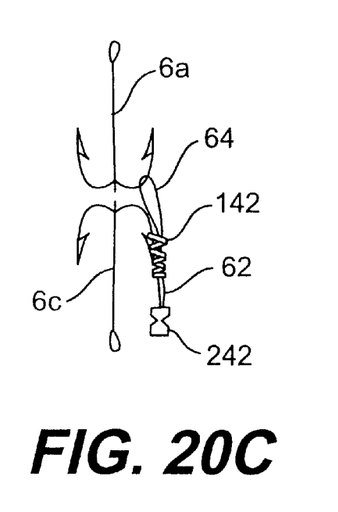
FIG. 20c illustrates the fifth alternate embodiment of the present invention in use on fishing hooks.

FIG. 20c illustrates the fifth alternate embodiment of the present invention in use on a two hook fishing lure wherein the first looped end 64 engages treble hook 6a. The spring slider 142 is positioned over the second treble hook 6b. It should be understood that use of the fifth alternate embodiment of the present invention is suitable for use on a three hook fishing lure wherein crimp 242 would engage the back treble hook and spring slider 142 would engage the middle treble hook.

Figure 21A:
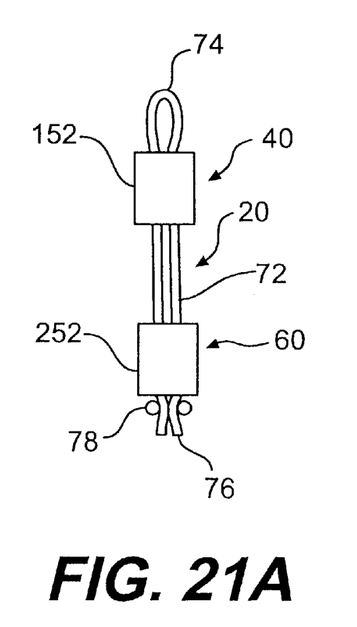
FIG. 21a illustrates a sixth alternate embodiment of the present invention.
Figure 21B:
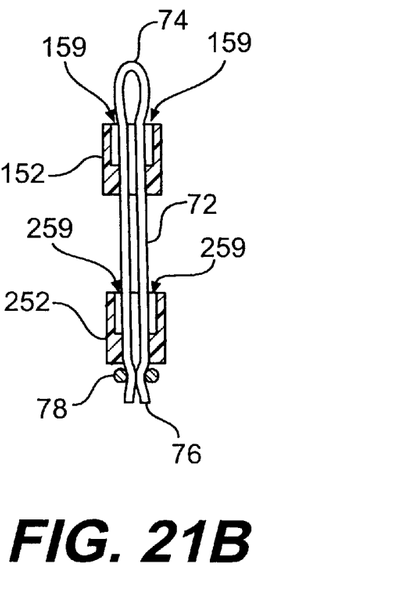
FIG. 21b illustrates a partial cross-sectional view of the sixth alternate embodiment of the present invention.

FIG. 21a illustrates a sixth alternate embodiment of the present invention wherein body 20 comprises flexible cord 72 having first looped end 74 and second end 76. A stop 78 is provided at second end 76 to prevent the sliders from being removed from flexible cord 74. First securing element 40 comprises a slider 152, while second securing element 60 comprises a slider 252. As can be seen in FIG. 21b, slider 152 and slider 252 include hook receiving spaces 159 and 259 respectively.

Figure 21C:
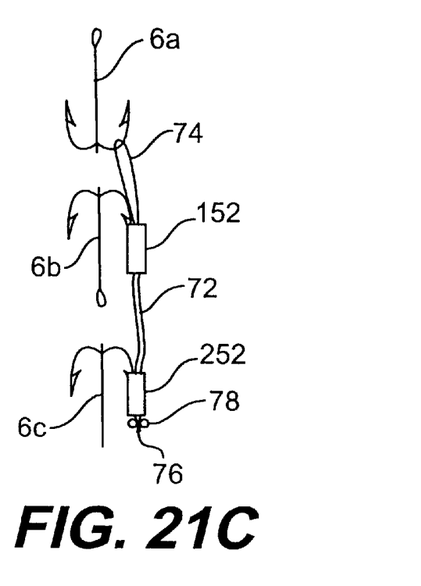
FIG. 21c illustrates the sixth alternate embodiment of the present invention in use engaging fishing hooks.

In use as shown in FIG. 21c, first looped end 74 engages treble hook 6a, slider 152 engages treble hook 6b, and slider 252 engages treble hook 6c as described for the other embodiments of the present invention.

Figure 22A:
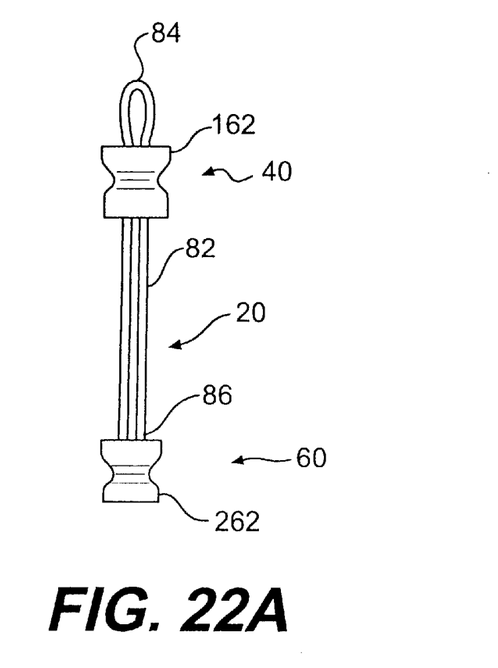
FIG. 22a illustrates a front view of a seventh alternate embodiment of the present invention.
Figure 22B:
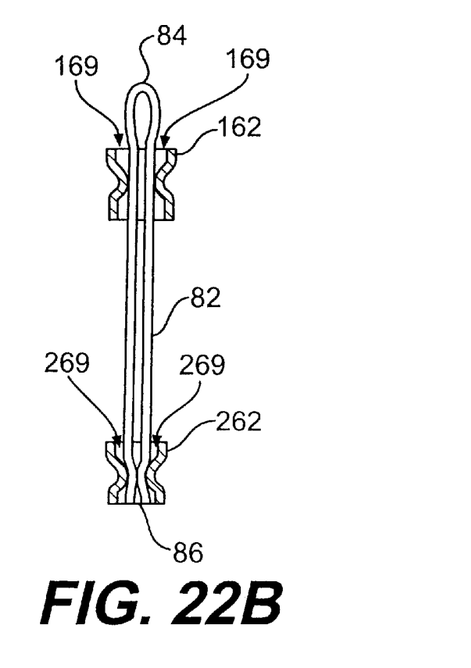
FIG. 22b illustrates a partial cross-sectional view of the seventh alternate embodiment of the present invention.

FIG. 22a illustrates a seventh alternate embodiment of the present invention wherein body 20 comprises flexible cord 82. First securing element 40 comprises a crimp slider 162 and second securing element 60 comprises a crimp 262. Slider 162 and slider 262 include hook receiving spaces 169 and 269 respectively. Flexible cord 82 includes a first looped end 84 and second end 86. Slider crimp 162 is positionable allowing the flexible cord 82 while crimp 262 is preferably secured at end 86. The seventh alternate embodiment of the present invention can be secured to a two or a three hook fishing lure in the same manner as the previous embodiments.

Figure 23A:
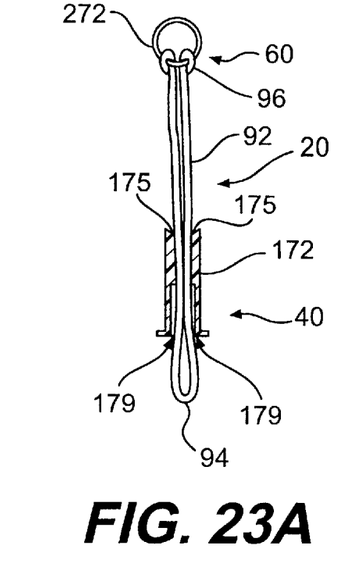
FIG. 23a illustrates a partial cross-sectional view of the eighth alternative embodiment of the present invention.

FIG. 23a illustrates an eighth alternate embodiment of the present invention wherein body 20 comprises a stretch band 92 having a first looped end 94 and a second end 96. First securing element 40 comprises a slider 172 and second securing element 60 comprises a split ring 272. Slider 172 is provided with band gripper points 175 to selectively engage band 92 and hold slider 172 in its desired position on band 92. Slider 172 also includes hook receiving space 179. Gripper points 175 help provide a snug fit for slider 172 on band 92, but can readily be positioned by the force applied by a user. Second end 96 is suitably attached to split ring 60 by any known manner of securing.

Figure 23B:
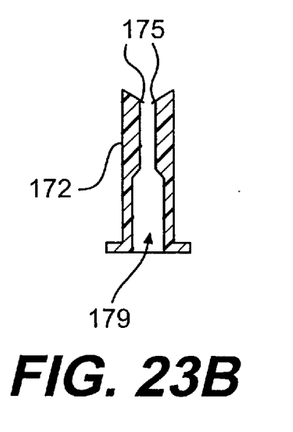

FIG. 23b illustrates an enlarged cross-sectional view of the slider of FIG. 23a. Gripper points 175 can be seen on one end of slider 172 around an interior perimeter thereof.

Figure 23C:
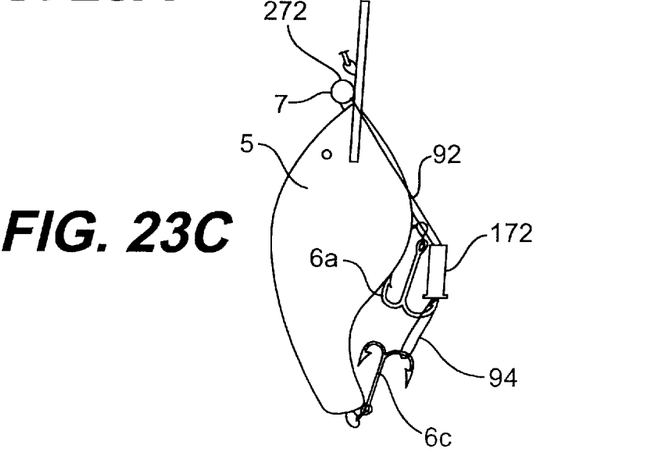
FIG. 23c illustrates a side view of the eighth alternate embodiment in use on a two hook fishing lure.

FIG. 23c illustrates the eighth alternate embodiment of the present invention in use on a two hook fishing lure wherein the first looped end 94 engages treble hook 6c. Slider 172 is positioned over treble hook 6a. Split ring 272 is then positioned around eyelet 7 of the fishing lure 5.

Figure 23D:
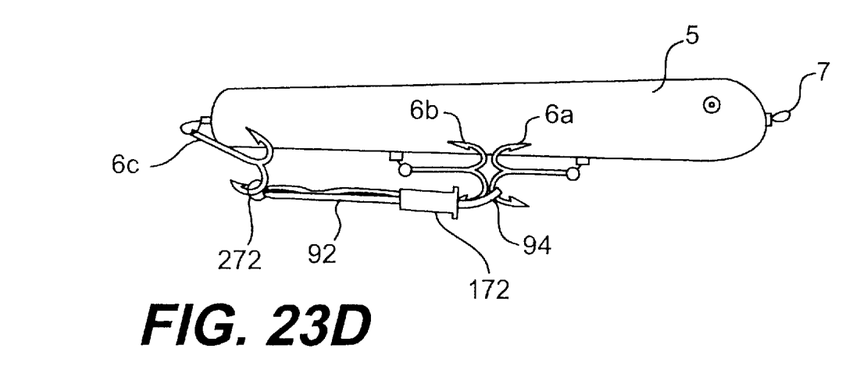
FIG. 23d illustrates a side view of the eighth alternate embodiment in use on a three hook fishing lure.

FIG. 23d illustrates the eighth alternate embodiment of the present invention in use on a three hook fishing lure wherein the first looped end 94 engages treble hook 6a. Slider 172 is positioned over treble hook 6b. Split ring is then positioned around treble hook 6c.

It is to be understood that the embodiments herein described are merely illustrative of the principles of the present invention. Various modifications may be made by those skilled in the art without departing from the spirit or the scope of the claims which follow.

What is claimed is:

1. A method of securing the fishing hooks of a fishing lure, said method comprising the steps of:

providing a fishing lure hook holder including a body having a first end and a second end, a first securing element affixed at said first end, a second securing element movably positionable on said body, and a third securing element affixed at said second end;

placing said first securing element around a first hook; and placing said second securing element around a second hook.

2. The method of securing of claim 1, further comprising the step of:

placing said third securing element around a third hook.

3. The method of securing of claim 1, further comprising the step of:

placing said third securing element around an eyelet on said fishing lure.

4. A fishing lure hook holder for securing the fishing hooks of a fishing lure, said fishing lure hook holder comprising:

a strip having a first end, a second end, and means for engagement along said strip, said first end including means for receiving a fishing hook;

a first securing element movably positioned on said strip and having means for receiving a fishing hook being a space for receiving a fishing hook; and a second securing element movably positioned on said strip and having means for receiving a fishing hook being a space for receiving a fishing hook;

said first securing element and said second securing element including means for engaging said means for engagement;

at least two of said means for receiving, said first securing element, and said second securing element cooperating to hold the fishing hooks of said fishing lure in close proximity thereto.

* * * * *